(12) United States Patent
Jayraman et al.

(10) Patent No.: US 12,664,001 B1
(45) Date of Patent: *Jun. 23, 2026

(54) UNIFIED EXTENSIBLE FIRMWARE INTERFACE (UEFI) CAPSULE-BASED UPDATE OF FIRMWARE LOGO IMAGE

(71) Applicant: AMERICAN MEGATRENDS INTERNATIONAL, LLC, Duluth, GA (US)

(72) Inventors: Ravishankar Jayraman, Cuddalore District (IN); Imtiyaz Karim, Chennai (IN); Ravindar Dhamodharan, Chennai (IN); Ramesh R, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 52 days.

This patent is subject to a terminal disclaimer.

(21) Appl. No.: 18/902,340

(22) Filed: Sep. 30, 2024

Related U.S. Application Data

(63) Continuation of application No. 18/147,543, filed on Dec. 28, 2022, now Pat. No. 12,135,973.

(51) Int. Cl.
| | |
|---|---|
| *G06F 8/65* | (2018.01) |
| *G06F 9/4401* | (2018.01) |
| *G06F 21/57* | (2013.01) |

(52) U.S. Cl.
CPC .............. *G06F 9/4411* (2013.01); *G06F 8/65* (2013.01); *G06F 21/572* (2013.01)

(58) Field of Classification Search
CPC ......... G06F 6/4411; G06F 8/65; G06F 21/572

USPC ........................................................... 710/10
See application file for complete search history.

(56) References Cited

U.S. PATENT DOCUMENTS

| | | | |
|---|---|---|---|
| 2020/0394303 A1* | 12/2020 | Suryanarayana | ..... G06F 21/572 |
| 2023/0289446 A1* | 9/2023 | Liu | ....................... G06F 21/575 |
| 2023/0325201 A1* | 10/2023 | Suryanarayana | ....... G06F 9/544 |
| | | | 713/2 |
| 2024/0036853 A1* | 2/2024 | Suryanarayana | ......... G06F 8/65 |
| 2024/0134625 A1* | 4/2024 | Xie | ....................... G06F 9/4451 |

OTHER PUBLICATIONS

Brian Richardson & Michael Kinney, System Firmware and Device Firmware Updates using Unified Extensible Firmware Interface (UEFI) Capsule, Intel, pp. 1-19 (Year: 2018).*

* cited by examiner

*Primary Examiner* — Christopher B Shin
(74) *Attorney, Agent, or Firm* — Newport IP, LLC; Ryan Donoghue

(57) ABSTRACT

A firmware is configured with a firmware management protocol ("FMP") capable of updating a firmware logo image and a firmware logo image volume is defined within a firmware for storing a firmware logo image. A firmware logo image updater executing on a computing device receives a UEFI capsule that contains a firmware logo image. The firmware logo image updater stores the UEFI capsule in a UEFI system partition on a computer-readable storage medium accessible to the computing device. Upon a reboot of the computing device, the FMP is executed. The FMP retrieves the UEFI capsule from the UEFI system partition. The FMP then updates the firmware logo image volume with the firmware logo image stored in the UEFI capsule.

9 Claims, 4 Drawing Sheets

UNIFIED EXTENSIBLE FIRMWARE INTERFACE (UEFI) CAPSULE-BASED UPDATE OF FIRMWARE LOGO IMAGE

CROSS-REFERENCE TO RELATED APPLICATION

This application is a continuation of U.S. patent application Ser. No. 18/147,543, filed Dec. 28, 2022, the content of which application is hereby expressly incorporated herein by reference in its entirety.

BACKGROUND

Many types of computing devices display an image, or images, at boot time. For example, firmware executing on a computing device might display an on-screen image, or images, when the computing device is powered on or rebooted that identifies the manufacturer of the computing device or the developer of the firmware. These images are commonly referred to as "firmware logo images."

Original equipment manufacturers ("OEMs") of computing devices commonly obtain motherboards from original design manufacturers ("ODMs") and create computing devices based on the motherboards. One of the main modifications that OEMs make to ODM-manufactured motherboards is to replace the firmware logo image in the firmware installed on the motherboards by the ODMs with an OEM-specific firmware logo image.

One method for modifying the firmware of a computing device to include an OEM-specific firmware logo image involves building a custom firmware that includes the OEM-specific firmware logo image for the OEM. Creating custom firmware for many OEMs can, however, be a difficult and time consuming process.

Another method for modifying the firmware of a computing device to include an OEM-specific firmware logo image involves utilizing custom software tools that require that the firmware be re-cryptographically signed. Re-signing firmware may, however, interfere with security updates to a computing device.

The two methods identified above for modifying the firmware of a computing device to include an OEM-specific firmware logo image also require the entire firmware to be re-flashed (i.e., programmed into a non-volatile memory device). Re-flashing an entire firmware may, however, result in a firmware becoming corrupted such as, for example, in the event of power loss during the firmware update. Corrupted firmware can cause a computing device to be unable to boot.

It is with respect to these and other technical considerations that the disclosure made herein is presented.

SUMMARY

Technologies are described herein for UEFI capsule-based updating of a firmware logo image. Through implementations of the disclosed technologies, the firmware logo image of a computing device can be updated without re-flashing an entire firmware. Implementations of the disclosed technologies can also update a firmware logo image in a secure manner that prevents a computing device from becoming unable to boot in the event of power loss during update of the firmware logo image. Technical benefits other than those specifically mentioned herein can also be realized through implementations of the disclosed technologies.

In order to provide these technical benefits, and potentially others, a computing device is provided that includes a firmware that implements aspects of the disclosed technologies. In an embodiment, for instance, the firmware is a Unified Extensible Firmware Interface ("UEFI") Specification-compliant firmware that has been configured with a firmware management protocol ("FMP") capable of updating a firmware logo image, which may be referred to herein as the "logo update FMP." Additionally, a separate region, referred to herein as the "firmware logo image volume," is defined within the firmware for storing a firmware logo image. The firmware logo image volume is signed or hashed separately from the remainder of the firmware and, therefore, modifications to the contents of the firmware logo image volume will not result in the need to re-cryptographically sign the entire firmware.

In an embodiment, a firmware logo image updater executing on a computing device receives a UEFI capsule that contains a firmware logo image. For example, in an embodiment, the firmware logo image updater receives the UEFI capsule from a firmware update server. The firmware logo image updater receives the UEFI capsule from other sources in other embodiments.

In an embodiment, the UEFI capsule includes a globally unique identifier ("GUID") in addition to the firmware logo image. In this embodiment, the firmware logo image updater is configured to authenticate the contents of the UEFI capsule based on the specified GUID.

The firmware logo image updater stores the UEFI capsule in a UEFI system partition on a computer-readable storage medium accessible to the computing device. Upon a reboot of the computing device, the logo update FMP is executed. The logo update FMP retrieves the UEFI capsule from the UEFI system partition. The logo update FMP then updates the firmware logo image volume with the firmware logo image stored in the UEFI capsule.

It should be appreciated that the above-described subject matter can also be implemented as a computer-controlled apparatus, a computer process, a computing system or device, or as an article of manufacture such as a computer-readable storage medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for UEFI capsule-based updating of a firmware logo image. As discussed briefly above, implementations of the disclosed technologies enable the firmware logo image of a computing device to be updated without re-flashing an entire firmware. Implementations of the disclosed technologies can also update a firmware logo image in a secure manner that prevents a computing device from becoming unable to boot in the event of power loss during update of the firmware logo image. Technical benefits other than those specifically mentioned herein can also be realized through implementations of the disclosed technologies.

Before discussing the various embodiments presented herein, it is to be appreciated that the subject matter presented herein can be implemented as a computer process, a computer-controlled system or apparatus, a computing device, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system and device configurations beyond those described herein, including multi-processor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings provided herewith are not drawn to scale. Like numerals represent like elements throughout the several figures (which might be referred to herein as a "FIG." or "FIGS.").

Figure 1:
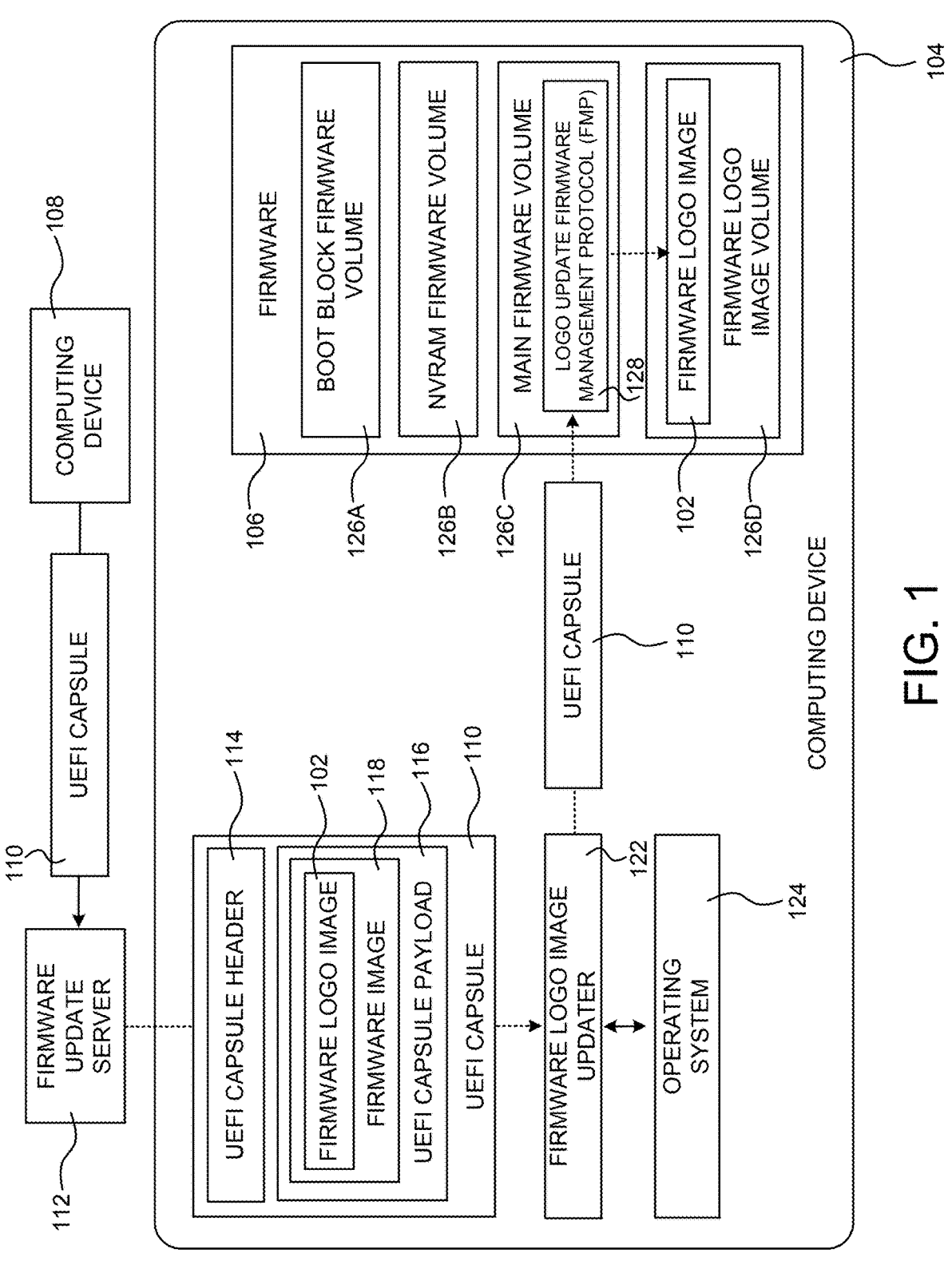
FIG. 1 is a computing device architecture diagram showing aspects of one mechanism disclosed herein for UEFI capsule-based updating of a firmware logo image.

FIG. 1 is a computing device architecture diagram showing aspects of one mechanism disclosed herein for UEFI capsule-based updating of a firmware logo image. As described briefly above, many types of computing devices display an image, or images, at boot time. For example, firmware executing on a computing device, such as the computing device 104 shown in FIG. 1, might display an on-screen image, or images, when the computing device is powered on or rebooted that identifies the manufacturer of the computing device, the developer of the firmware, or provides other information. These images are commonly referred to as "firmware logo images."

As also discussed briefly above, OEMs of computing devices commonly obtain motherboards from ODMs and create computing devices based on the motherboards. One of the main modifications that OEMs make to ODM-manufactured motherboards is to replace the firmware logo image in the firmware installed on the motherboards by the ODMs with an OEM-specific firmware logo image.

One method for modifying the firmware of a computing device to include an OEM-specific firmware logo image involves building a custom firmware that includes the OEM-specific firmware logo image for the OEM. Creating custom firmware for many OEMs can, however, be a difficult and time consuming process.

Another method for modifying the firmware of a computing device to include an OEM-specific firmware logo image involves utilizing custom software tools that require that the firmware be re-cryptographically signed. Re-signing firmware may, however, interfere with security updates to a computing device.

The two methods identified above for modifying the firmware of a computing device to include an OEM-specific firmware logo image also require the entire firmware to be re-flashed (i.e., programmed into a non-volatile memory device). Re-flashing an entire firmware may, however, result in a firmware becoming corrupted such as, for example, in the event of power loss during the firmware update. Corrupted firmware can cause a computing device to be unable to boot.

In order to address the technical considerations set forth above, and potentially others, a computing device 104 is provided that includes a firmware 106 that implements aspects of the disclosed technologies. In an embodiment, for instance, the firmware 106 is a UEFI Specification-compliant firmware. Additional details regarding the configuration and operation of a UEFI Specification-compliant firmware will be provided below with regard to FIG. 3.

As shown in FIG. 1, the firmware 106 is configured with a FMP 128 (which may be referred to herein as the "logo update FMP 128") capable of updating a firmware logo image 102. As discussed briefly above, the firmware 106 executing on the computing device 104 can display the firmware logo image 102 when the computing device 104 is powered on or rebooted. The firmware logo image 102 can identify the manufacturer of the computing device 104, the developer of the firmware 106, or provide other information to a user of the computing device 104.

A separate region, referred to herein as the "firmware logo image volume 126D," is defined within the firmware 106 for storing a firmware logo image 102. The firmware logo image volume 126D is cryptographically signed or hashed separately from the remainder of the firmware 106 and, therefore, modifications to the contents of the firmware logo image volume 126D will not result in the need to re-cryptographically sign the entire firmware 106. In contrast, modifications to the contents of the boot block firmware volume 126A, the non-volatile random access memory ("NVRAM") firmware volume 126B, or the main firmware volume 126C would require that the entire firmware 106 be re-cryptographically signed.

In an embodiment, a firmware logo image updater 122 executes on an operating system 124 executing on the computing device 104. The firmware logo image updater 122 is a software component configured to retrieve a UEFI capsule 110 that contains a firmware logo image 102. A UEFI capsule is a data structure defined by the UEFI Specification for use in transferring firmware update information from the operating system 124 to the firmware 106.

In an embodiment, another computing device 108 is utilized to create the UEFI capsule 110. The computing device 108 can then be utilized to provide the UEFI capsule 110 to the firmware logo image updater 122. In an embodiment, the computing device 108 provides the UEFI capsule 110 to a firmware update server 112. The firmware logo image updater 122 retrieves the UEFI capsule 110 from the firmware update server 112. The firmware logo image updater 122 receives the UEFI capsule 110 from other sources in other embodiments. For example, the firmware logo image updater 122 can retrieve the UEFI capsule 110 from a mass storage device or another type of computer-readable storage medium in other embodiments.

As shown in FIG. 1, the UEFI capsule 110 includes a UEFI capsule payload 116 that includes a firmware image 118 containing the firmware logo image 102. The UEFI capsule 110 also includes a UEFI capsule header 114. In an embodiment, the UEFI capsule header 114 stores a globally unique identifier ("GUID") (not shown in FIG. 1). In this embodiment, the firmware logo image updater 122 is configured to authenticate the contents of the UEFI capsule 110 based on the specified GUID. For instance, the firmware logo image updater 122 can determine based on the GUID whether the computing device 104 supports the UEFI capsule 110. If the computing device 104 does not support the UEFI capsule 110, the operations described below for updating the firmware logo image 102 will not be performed.

In an embodiment, the firmware logo image updater 122 stores the UEFI capsule 110 in a UEFI system partition 316 (shown in FIG. 3) on a computer-readable storage medium accessible to the computing device 104. Upon a reboot of the computing device 104, the logo update FMP 128 is executed. The logo update FMP 128 retrieves the UEFI capsule 110 from the UEFI system partition 316. The logo update FMP 128 then updates the firmware logo image volume 126D with the firmware logo image 102 stored in the UEFI capsule 110. Additional details regarding this process will be provided below with respect to FIG. 2.

Figure 2:
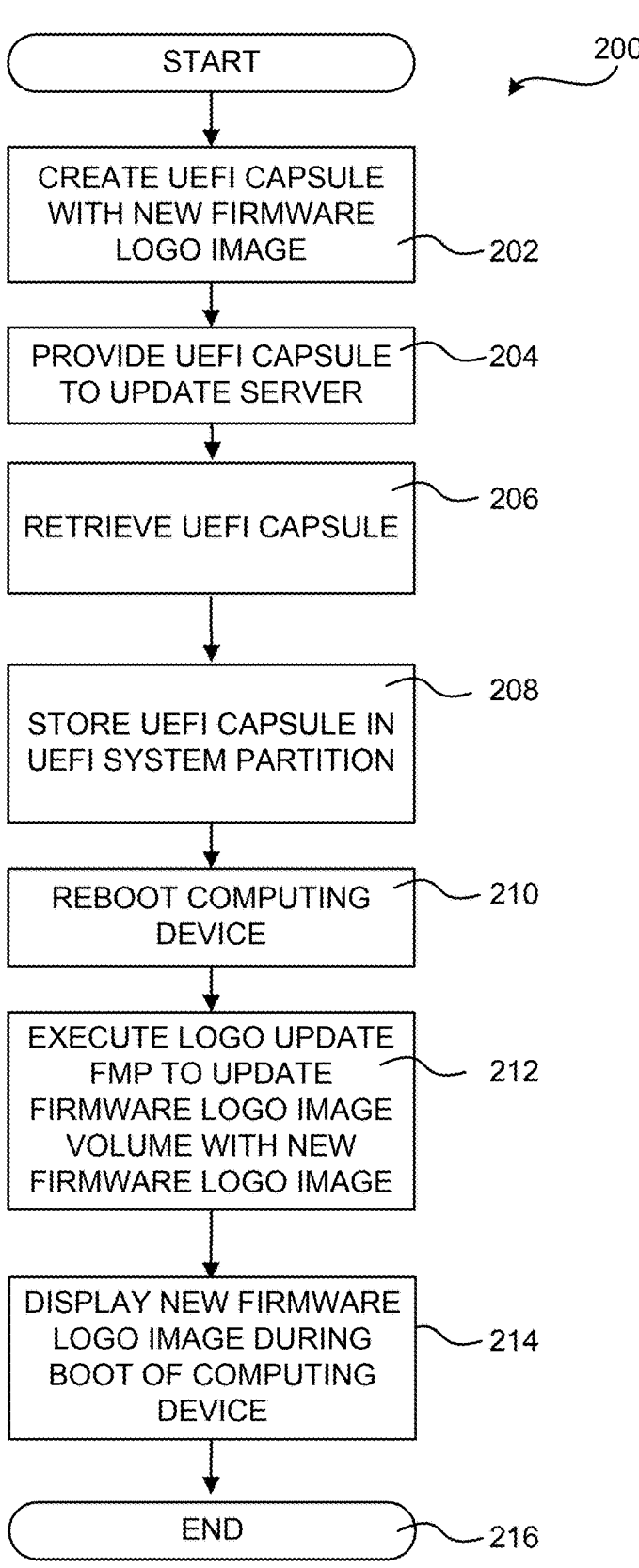
FIG. 2 is a flow diagram showing a routine that illustrates aspects of the mechanism for updating a firmware logo image shown in FIG. 1, according to one embodiment presented herein.

FIG. 2 is a flow diagram showing a routine 200 that illustrates aspects of the operation of the mechanism shown in FIG. 1 for UEFI capsule-based updating of a firmware logo image 102, according to one embodiment presented herein. It is to be appreciated that the logical operations described herein with respect to FIG. 2 and the other FIGS., can be implemented (1) as a sequence of computer implemented acts or program modules running on a computing device and/or (2) as interconnected machine logic circuits or circuit modules within the computing device.

The implementation of the various components described herein is a matter of choice dependent on the performance and other requirements of the computing device. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 200 begins at operation 202, where the computing device 108 can be utilized to create a UEFI capsule 110 that is formatted in the manner shown in FIG. 1 and that includes a firmware logo image 102 for the computing device 104. The routine 200 then proceeds from operation 202 to operation 204, where the computing device 108 provides the UEFI capsule 110 to the firmware update server 112 in an embodiment.

From operation 204, the routine 200 proceeds to operation 206, where the firmware logo image updater 122 retrieves the UEFI capsule 110 from the firmware update server 112. The routine 200 then proceeds from operation 206 to operation 208, where the firmware logo image updater 122 stores the UEFI capsule 110 in the UEFI system partition 316 (shown in FIG. 3). The computing device 104 is then rebooted at operation 210.

From operation 210, the routine 200 proceeds to operation 212, where the computing device 104 executes the logo update FMP 128 to update the firmware logo image stored in the firmware logo image volume 126D with the firmware logo image 102 contained in the UEFI capsule 110. Subsequently, at operation 214, the firmware 106 can display the firmware logo image 102 on a display screen connected to the computing device 104 when the computing device is powered on or rebooted. From operation 214, the routine 200 proceeds to operation 216, where it ends.

Figure 3:
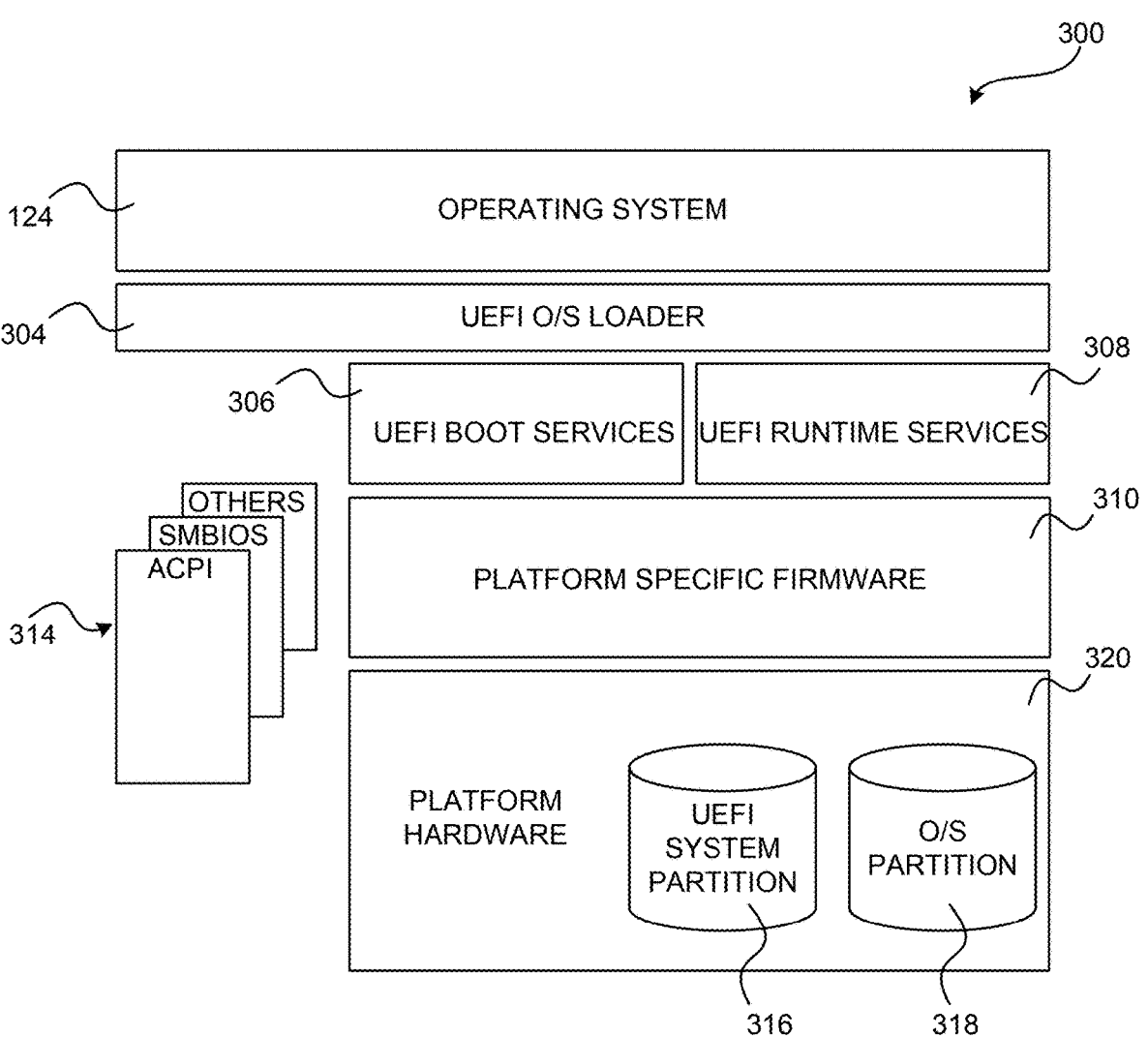
FIG. 3 is a software architecture diagram illustrating a software architecture for a UEFI-compliant firmware that provides an operating environment for aspects of the technologies presented herein in one embodiment.

Turning now to FIG. 3, a software architecture diagram will be described that illustrates an architecture 300 for a UEFI Specification-compliant firmware that can be configured to provide and/or utilize aspects of the technologies disclosed herein. In particular, the firmware architecture 300 shown in FIG. 3 can be utilized to implement the firmware 106 described above. The firmware 106 can also be implemented in other ways in other configurations.

The UEFI Specification describes an interface between an OS 124 and a UEFI Specification-compliant firmware 106. The UEFI Specification also defines an interface that a firmware 106 can implement, and an interface that an OS 124 can use while booting. How a firmware implements the interface can be left up to the manufacturer of the firmware 106. The UEFI Specification also defines a way for an OS 124 and a firmware 106 to exchange information necessary to support the operating system boot process. The term "UEFI Specification" used herein refers to the EFI Specification developed by INTEL CORPORATION, the UEFI Specification managed by the UEFI FORUM, and other related specifications available from the UEFI FORUM.

As shown in FIG. 3, the architecture can include platform hardware 320, such as that described below with regard to FIG. 4, an OS 124, and a UEFI system partition 316. The UEFI system partition 316 can be an architecturally shareable system partition. As such, the UEFI system partition 316 can define a partition and file system designed to support safe sharing of mass storage between multiple vendors. An OS partition 318 can also be utilized to store the OS 124.

Once started, the UEFI OS loader 304 can continue to boot the complete OS 124. In doing so, the UEFI OS loader 304 can use UEFI boot services 306, UEFI runtime services 308, and an interface to other supported specifications, to survey, comprehend, and initialize the various platform components and the OS software that manages them. Thus, interfaces 314 from other specifications can also be present on the system. For example, the Advanced Configuration and Power Management Interface ("ACPI") and the System Management BIOS ("SMBIOS") specifications can be supported.

UEFI boot services 306 can provide interfaces for devices and system functionality used during boot time. UEFI runtime services 308 can also be available to the UEFI OS loader 304 during the boot phase and can provide interfaces, such as the services described above. UEFI allows extension of platform specific firmware 310 by loading UEFI driver and UEFI application images (not shown in FIG. 3) which, when loaded, have access to UEFI-defined runtime and boot services such as those described above.

Additional details regarding the operation and architecture of a UEFI Specification-compliant firmware can be found in the UEFI Specification, which is available from the UEFI Forum. The UEFI Forum has also provided further details regarding recommended implementation of UEFI in the form of the Platform Initialization ("PI") Specification. Unlike the UEFI Specification, which focuses on programmatic interfaces for the interactions between the OS 124 and system firmware 106, the PI specification describes a firmware implementation that has been designed to perform the full range of operations that are required to initialize a platform from power on through transfer of control to the OS 124. The PI specification, which is available from UEFI Forum, is also expressly incorporated herein by reference.

Figure 4:
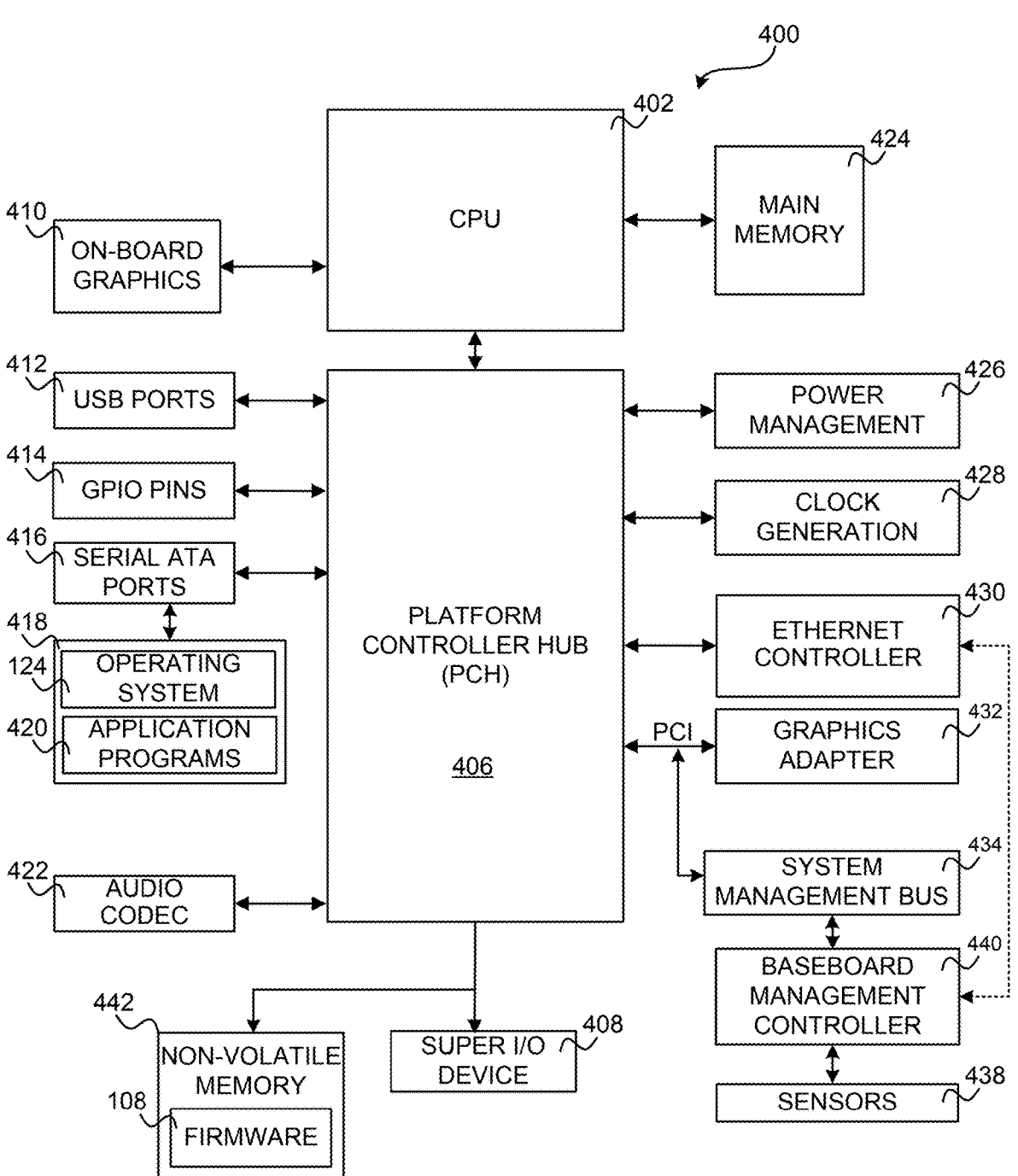
FIG. 4 is a computer architecture diagram that shows an illustrative architecture for a computer that can implement the technologies disclosed herein.

Referring now to FIG. 4, a computer architecture diagram that shows an illustrative architecture for a computer that can provide an operating environment for the technologies presented herein will be described. For example, and without limitation, the computer architecture shown in FIG. 4 can be utilized to implement a computing device 104 that executes the firmware 106.

FIG. 4 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 4 shows an illustrative computer architecture for a computer 400 that can implement the technologies described herein. The illustrative computer architecture shown in FIG. 4 includes a baseboard, or "motherboard", which is a printed circuit board to which a multitude of components or devices can be connected by way of a system bus or other electrical communication path. In one illustrative configuration, a central processing unit ("CPU") 402 operates in conjunction with a Platform Controller Hub ("PCH") 406. The CPU 402 is a central processor that performs arithmetic and logical operations necessary for the operation of the computer 400. The computer 400 can include a multitude of CPUs 402. Each CPU 402 might include multiple processing cores.

The CPU 402 provides an interface to a RAM used as the main memory 424 in the computer 400 and, possibly, to an on-board graphics adapter 410. The PCH 406 provides an interface between the CPU 402 and the remainder of the computer 400.

The PCH 406 can also be responsible for controlling many of the input/output functions of the computer 400. In particular, the PCH 406 can provide one or more universal serial bus ("USB") ports 412, an audio codec 422, an Ethernet controller 430, and one or more general purpose input/output ("GPIO") pins 414. The USB ports 412 can include USB 2.0 ports, USB 3.0 ports and USB 3.1 ports among other USB ports.

The PCH 406 can also include functionality for providing networking functionality through an Ethernet controller 430. The Ethernet controller 430 is capable of connecting the computer 400 to another computer via a network. Connections that can be made by the Ethernet controller 430 can include LAN or WAN connections. LAN and WAN networking environments are commonplace in offices, enterprise-wide computer networks, intranets, and the Internet.

The PCH 406 can also provide a bus for interfacing peripheral card devices such as a graphics adapter 432. In one configuration, the bus comprises a PCI bus. The PCI bus can include a Peripheral Component Interconnect ("PCI") bus, a Peripheral Component Interconnect extended ("PCI-X") bus and a Peripheral Component Interconnect Express ("PCIe") bus among others.

The PCH 406 can also provide a system management bus 434 for use in managing the various components of the computer 400. Additional details regarding the operation of the system management bus 434 and its connected components are provided below. Power management circuitry 426 and clock generation circuitry 428 can also be utilized during the operation of the PCH 406.

The PCH 406 is also configured to provide one or more interfaces for connecting mass storage devices to the computer 400. For instance, according to one configuration, the PCH 406 includes a serial advanced technology attachment ("SATA") adapter for providing one or more serial ATA ports 416. The serial ATA ports 416 can be connected to one or more mass storage devices storing an OS, such as OS 124 and application programs 420, such as a SATA disk drive 418. As known to those skilled in the art, an OS 124 comprises a set of programs that control operations of a computer and allocation of resources. An application 420 is software that runs on top of the OS 124, or other runtime environment, and uses computer resources to perform application specific tasks desired by the user, such as those described herein.

According to one configuration, the OS 124 comprises the LINUX operating system. According to another configuration, the OS 124 comprises the WINDOWS operating system from MICROSOFT CORPORATION. According to another configuration, the OS 124 comprises the UNIX operating system or one of its variants. It should be appreciated that other operating systems can also be utilized.

The mass storage devices connected to the PCH 406, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data.

However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 400.

A low pin count ("LPC") interface can also be provided by the PCH 406 for connecting a Super I/O device 408. The Super I/O device 408 is responsible for providing a number of input/output ports, including a keyboard port, a mouse port, a serial interface, a parallel port, and other types of input/output ports. The LPC interface can also connect a computer storage media such as a ROM or a flash memory such as a non-volatile memory 442 for storing firmware 106 that includes program code containing the basic routines that help to start up the computer 400 and to transfer information between elements within the computer 400 as discussed above.

It should be appreciated that the program modules disclosed herein, including the firmware 106, can include software instructions that, when loaded into the CPU 402 and executed, transform a general-purpose computer 400 into a special-purpose computer 400 customized to facilitate all, or part of, the operations disclosed herein. As detailed throughout this description, the program modules can provide various tools or techniques by which the computer 400 can participate within the overall systems or operating environments using the components, logic flows, and/or data structures discussed herein.

The CPU 402 can be constructed from any number of transistors or other circuit elements, which can individually or collectively assume any number of states. More specifically, the CPU 402 can operate as a state machine or finite-state machine. Such a machine can be transformed to a second machine, or a specific machine, by loading executable instructions contained within the program modules.

These computer-executable instructions can transform the CPU 402 by specifying how the CPU 402 transitions between states, thereby transforming the transistors or other circuit elements constituting the CPU 402 from a first machine to a second machine, wherein the second machine can be specifically configured to perform the operations disclosed herein. The states of either machine can also be transformed by receiving input from one or more user input devices, network interfaces (such as the Ethernet controller 430), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include but are not limited to the technology used to implement the storage media, whether the storage media are characterized as primary or secondary storage, and the like. For example, if the storage media are implemented as semiconductor-based memory, the program modules can transform the physical state of the semiconductor main memory 424 and/or non-volatile memory 442. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 406 can include a system management bus 434. The system management bus 434 can include a baseboard management controller ("BMC") 440. The BMC 440 is a microcontroller that monitors operation of the computer 400. The BMC 440 monitors health-related aspects associated with the computer 400, such as, but not limited to, the temperature of one or more components of the computer 400, speed of rotational components (e.g., spindle motor, CPU fan, etc.) within the computer 400, the voltage across or applied to one or more components within the computer 400, and the available and/or used capacity of memory devices within the computer 400. To accomplish these monitoring functions, the BMC 440 is communicatively connected to one or more components by way of the system management bus 434 in some configurations.

In one configuration, these components include sensor devices 438 for measuring various operating and performance-related parameters within the computer 400. The sensor devices 438 can be either hardware or software based components configured or programmed to measure or detect one or more of the various operating and performance-related parameters.

The BMC 440 functions as the master on the system management bus 434 in most circumstances but can also function as either a master or a slave in other circumstances. Each of the various components communicatively connected to the BMC 440 by way of the system management bus 434 is addressed using a slave address. The system management bus 434 is used by the BMC 440 to request and/or receive various operating and performance-related parameters from one or more components, such as the firmware 106, which are also communicatively connected to the system management bus 434.

It should be appreciated that the functionality provided by the computer 400 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 400 might not include all the components shown in FIG. 4, can include other components that are not explicitly shown in FIG. 4, or might utilize an architecture completely different than that shown in FIG. 4.

Based on the foregoing, it should be appreciated that technologies for UEFI capsule-based updating of a firmware logo image have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computing device, comprising:

one or more processors; and at least one non-transitory computer-readable storage medium having computer-executable instructions stored thereupon which, when executed by the one or more processors, cause the computing device to:

receive, at a firmware logo image updater executing on the computing device, a Unified Extensible Firmware Interface (UEFI) capsule, the UEFI capsule comprising a firmware logo image;

store the UEFI capsule in a UEFI system partition; and execute a firmware upon a reboot of the firmware comprising a logo update firmware management protocol (FMP) configured to retrieve the UEFI capsule from the UEFI system partition and to update a firmware logo image volume within the firmware, wherein the firmware comprises a boot block firmware volume, a non-volatile random access memory (NVRAM) firmware volume, a main firmware volume, and the firmware logo image volume, wherein the firmware logo image volume is a separately defined region within the firmware, wherein the firmware logo image volume is cryptographically signed or hashed independently of the boot block firmware volume, the NVRAM firmware volume, and the main firmware volume, wherein modification of the firmware logo image volume is performed while a previously generated cryptographic signature for the boot block firmware volume, the NVRAM firmware volume, and the main firmware volume remains valid, and wherein modification of the boot block firmware volume, the NVRAM firmware volume, or the main firmware volume results in cryptographically re-signing the entire firmware.

2. The computing device of claim 1, wherein the UEFI capsule further comprises a globally unique identifier (GUID) and wherein the firmware logo image updater is configured to authenticate the UEFI capsule based on the GUID.

3. The computing device of claim 1, wherein the firmware logo image updater is configured to receive the UEFI capsule from a firmware update server.

4. A non-transitory computer-readable storage medium having computer-executable instructions stored thereupon which, when executed by a computing device, cause the computing device to:

receive, at a firmware logo image updater executing on the computing device, a Unified Extensible Firmware Interface (UEFI) capsule, the UEFI capsule comprising a firmware logo image;

store the UEFI capsule in a UEFI system partition; and execute a firmware upon a reboot of the firmware comprising a logo update firmware management protocol (FMP) configured to retrieve the UEFI capsule from the UEFI system partition and to update a firmware logo image volume within the firmware, wherein the firmware comprises a boot block firmware volume, a non-volatile random access memory (NVRAM) firmware volume, a main firmware volume, and the firmware logo image volume, wherein the firmware logo image volume is a separately defined region within the firmware, wherein the firmware logo image volume is cryptographically signed or hashed independently of the boot block firmware volume, the NVRAM firmware volume, and the main firmware volume, wherein modification of the firmware logo image volume is performed while a previously generated cryptographic signature for the boot block firmware volume, the NVRAM firmware volume, and the main firmware volume remains valid, and wherein modification of the boot block firmware volume, the NVRAM firmware volume, or the main firmware volume results in cryptographically re-signing the entire firmware.

5. The non-transitory computer-readable storage medium of claim 4, wherein the UEFI capsule further comprises a globally unique identifier (GUID) and wherein the firmware logo image updater is configured to authenticate the UEFI capsule based on the GUID.

6. The non-transitory computer-readable storage medium of claim 4, wherein the firmware logo image updater is configured to receive the UEFI capsule from a firmware update server.

7. A computer-implemented method, comprising:

receiving, at a firmware logo image updater executing on a computing device, a Unified Extensible Firmware Interface (UEFI) capsule, the UEFI capsule comprising a firmware logo image;

storing the UEFI capsule in a UEFI system partition; and executing a firmware upon a reboot of the firmware comprising a logo update firmware management protocol (FMP) configured to retrieve the UEFI capsule from the UEFI system partition and to update a firmware logo image volume within the firmware, wherein the firmware comprises a boot block firmware volume, a non-volatile random access memory (NVRAM) firmware volume, a main firmware volume, and the firmware logo image volume, wherein the firmware logo image volume is a separately defined region within the firmware, wherein the firmware logo image volume is cryptographically signed or hashed independently of the boot block firmware volume, the NVRAM firmware volume, and the main firmware volume, wherein modification of the firmware logo image volume is performed while a previously generated cryptographic signature for the boot block firmware volume, the NVRAM firmware volume, and the main firmware volume remains valid, and wherein modification of the boot block firmware volume, the NVRAM firmware volume, or the main firmware volume results in cryptographically re-signing the entire firmware.

8. The method of claim 7, wherein the UEFI capsule further comprises a globally unique identifier (GUID) and wherein the firmware logo image updater is configured to authenticate the UEFI capsule based on the GUID.

9. The method of claim 7, wherein the firmware logo image updater is configured to receive the UEFI capsule from a firmware update server.

* * * * *